United States Patent
Boutaghou (12) 
(10) Patent No.: US 6,301,080 B1
(45) Date of Patent: Oct. 9, 2001

(54) DITHER METHOD TO UNLOAD NEGATIVE SUCTION AIR BEARINGS

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/251,918

(22) Filed: Feb. 17, 1999

Related U.S. Application Data (60) Provisional application No. 60/074,766, filed on Feb. 17, 1998.

(51) Int. Cl.[7] ............................. G11B 21/22; G11B 21/02
(52) U.S. Cl. ......................... 360/255; 360/75; 360/294.4
(58) Field of Search ................................. 360/294, 294.1, 360/294.2, 294.3, 294.5, 294.4, 294.6, 294.7, 264.1, 264.3, 264.5, 75, 78.04, 78.05, 78.12, 250, 254, 254.2, 254.7, 255

(56) References Cited

U.S. PATENT DOCUMENTS

| | | | |
|---|---|---|---|
| 4,530,021 | * | 7/1985 | Cameron ........................... 360/78.12 |
| 4,897,743 | * | 1/1990 | Kohno .................................... 360/75 |
| 5,024,968 | | 6/1991 | Engelsberg . |
| 5,034,828 | * | 7/1991 | Ananth et al. ......................... 360/75 |
| 5,313,352 | * | 5/1994 | Chikazawa et al. .............. 360/294.7 |
| 5,384,675 | * | 1/1995 | Crawforth et al. .................... 360/75 |
| 5,521,778 | | 5/1996 | Boutaghou et al. . |
| 5,708,540 | * | 1/1998 | Ananth et al. .................... 360/235.4 |
| 5,991,114 | * | 11/1999 | Huang et al. ......................... 360/75 |
| 6,002,549 | * | 12/1999 | Berman et al. ................... 360/294.4 |
| 6,046,884 | * | 4/2000 | Crane ................................ 360/244.2 |

FOREIGN PATENT DOCUMENTS

| | | | |
|---|---|---|---|
| 59-177762 | * | 10/1984 | (JP) ....................................... 360/75 |
| 62-40678 | * | 2/1987 | (JP) ....................................... 360/75 |

OTHER PUBLICATIONS

Braun, A. et al., "Excimer laser micromachining and replication of 3D optical surfaces", *Applied Surface Science*, vol. 127–129, pp. 911–914 (1998).

Chen, H.W. et al., "Glide Characteristics of a Laser Textured Disk", *IEEE Transactions on Magnetics*, vol. 33, No. 5, pp. 3103–3105 (Sep. 1997).

Takaishi, K. et al., "Microactuator Control For Disk Drive", *IEEE Transactions on Magnetics*, vol. 32, No. 3, pp. 1863–1866 (May 1996).

* cited by examiner

Primary Examiner—David L. Ometz
(74) Attorney, Agent, or Firm—Merchant & Gould P.C.

(57) ABSTRACT

A head gimbal assembly on a suspension for being loaded relative to a disk and a ramp facilitates the loading and unloading of the head relative to the disk. An air bearing effectively regulates the head and gimbal assembly and disk location. Unloading a suction air bearing when the head is unloaded from the disc comprises applying an excitation to the air bearing during unloading to effect a perturbation in the air bearing. The air bearing is a suction bearing, and an excitation pertubates at least one of the modes of the leading edge, trailing edge or roll mode.

21 Claims, 7 Drawing Sheets

BASIC STRUCTURE

FIG. 5B

DEFORMATION SHAPE

DITHER METHOD TO UNLOAD NEGATIVE SUCTION AIR BEARINGS

CROSS-REFERENCE TO RELATED APPLICATIONS

The present invention relates to Provisional Application Serial No. 60/074,766, filed Feb. 17, 1998, by Zine-Eddine Boutaghou, and entitled "DITHER METHOD TO UNLOAD NEGATIVE SUCTION AIR BEARINGS". Also application Ser. No. 09/081,393, filed May 18, 1998 by James Morgan Murphy and entitled "SUSPENSION-LEVEL PIEZOELECTRIC MICROACTUATOR discloses characteristics of the microactuator. The contents of these applications are incorporated by reference herein.

BACKGROUND OF THE INVENTION

The present invention relates generally to disk drives, and particularly to a gimbal-level piezoelectric microactuator for read/write heads for disk drives.

One of the major problems of using high suction air bearings in load/unload application shows up during the unloading of the heads. The negative suction forces induces an impulse loading contributing to the excitation of the head-gimbal assembly ("hga"). In addition to the excitation of the head-gimbal assembly, the hga is required to travel up the ramp a considerable distance before the system is able to overcome the suction force. The unload travel distance up the ramp translates into valuable unused real estate at the outside diameter of the disc.

Accordingly, there is a need in the art for an actuator for supporting and finely-positioning a read and/or write hga with sufficient accuracy and to operate with a minimum of unused real estate, namely substantially below that possible with typically known systems.

SUMMARY OF THE INVENTION

A head gimbal assembly on a suspension is loaded relative to a disk. A ramp facilitates the loading and unloading of the head relative to the disk. An air bearing effectively regulates the head and gimbal assembly and disk location. Unloading a suction air bearing when the head is unloaded from the disc comprises applying an excitation to the air bearing during unloading to effect a perturbation in the air bearing. The air bearing is a suction bearing, and an excitation pertubates at least one of the modes of the leading edge, trailing edge or roll mode.

A single or multiple air bearing modes can be excited during unload operation of the air bearing. A sweep function containing one or several air bearing modes to perturb the air bearing and cause an instability which eases unloading of the heads.

A microactuator can be used to generate the excitation. In case the excitation frequencies are low, the voice coil system can then be used. The amplitude of the excitation may be varied throughout the excitation. In some forms of the invention the gimbal modes, namely either twist and/or bending modes, can be excited to increase the forces acting on the air bearing contributing to overcome the suction forces.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Apparatus is provided for positioning a head adjacent a recording surface of a recording media, said recording surface defining multiple data track locations. The apparatus comprises a movable support arm having a flexure element. The flexure element is for supporting the head adjacent the recording surface and for movably positioning of the head relative to each data track location.

There are air bearing means for supporting the support arm relative to the recording surface, and means for exciting the air bearings during an unloading operation of the support arm. The head can be removed from the recording surface in a manner whereby there is a reduced suction force between the head and the recording surface.

The present invention preferably discloses a second-stage, fine-positioning, microactuator for use with a read/write head of a disk drive. The microactuator has a much higher bandwidth than VCM actuators, and excludes suspension resonances. The microactuator is a very small, lightweight device that is placed between the head and the suspension of the VCM actuator. The microactuator provides only a very small amount of movement—just enough to allow each head to follow its track. For example, only approximately ±0.5 $\mu$m of motion is necessary for a disk drive with a 1 $\mu$m track pitch (i.e., 25 k tpi track density).

Disk Drive Structure

Figure 1:
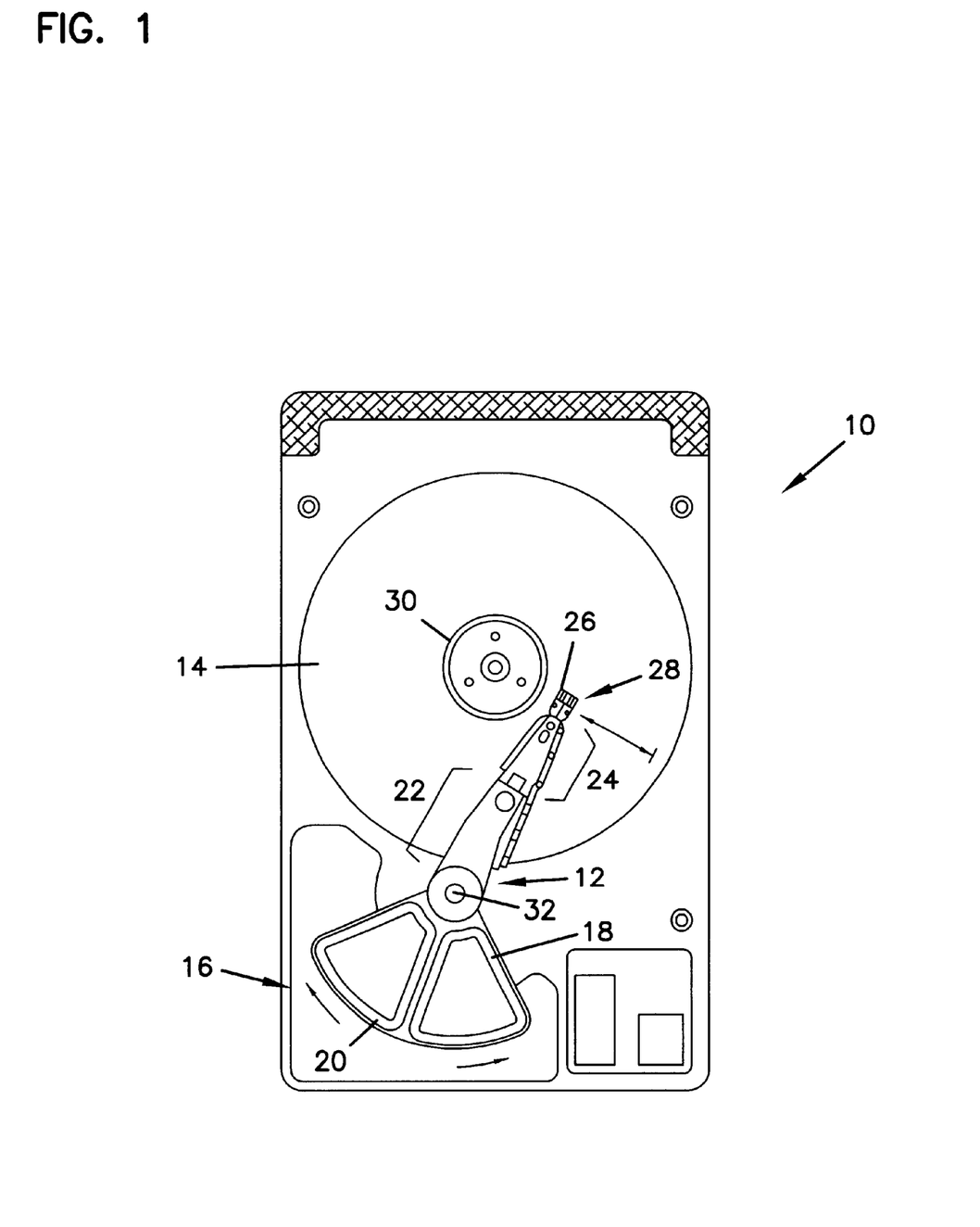
FIG. 1 is a top plan view of a disk drive assembly, wherein a top portion of the assembly has been cut-away to expose a head-arm assembly positioned over a platter.

FIG. 1 is a top plan view of a disk drive assembly 10, wherein a top portion of the assembly 10 has been cut-away to expose a head-arm assembly 12 positioned over a platter 14. In addition, a top portion of the magnetic structure assembly 16 is removed in order to expose the coil bobbins 18, 20 of a voice coil motor (VCM) that controls the movement of the head-arm assembly 12. The head-arm assembly 12 includes an arm 22, suspension member 24, microactuator 26, and a read/write head 28 positioned over the platter 14. Generally, a plurality of platters 14 are stacked on a spindle 30 and there are a plurality of head-arm assemblies 12 in an E-block structure to access the platters 14 simultaneously, wherein each head-arm assembly 12 accesses one of two surfaces (top and bottom) of each platter 14.

The head-arm assembly 12 is comprised of both a first stage positioner and a second stage positioner. The first stage positioner comprises the VCM, arm 22, and suspension member 24 that effect rotational movement of the head-arm assembly 12 about a pivot bearing 32 for coarse positioning. The second stage positioner comprises a suspension level piezoelectric microactuator 30 that effects very small, cross-track, movements of the read/write head 28 for fine positioning.

The first-stage positioner positions the read/write head 28 in the vicinity of the desired track of the platter 14. The second stage positioner then precisely aligns the read/write head 28 with the desired track of the platter 14.

The second stage positioner is capable of fine scale movements to define a range of movement in the order of about half the width of the desired track. In addition, the second stage positioner provides a much faster response.

Piezoelectric Microactuator

Figure 2:
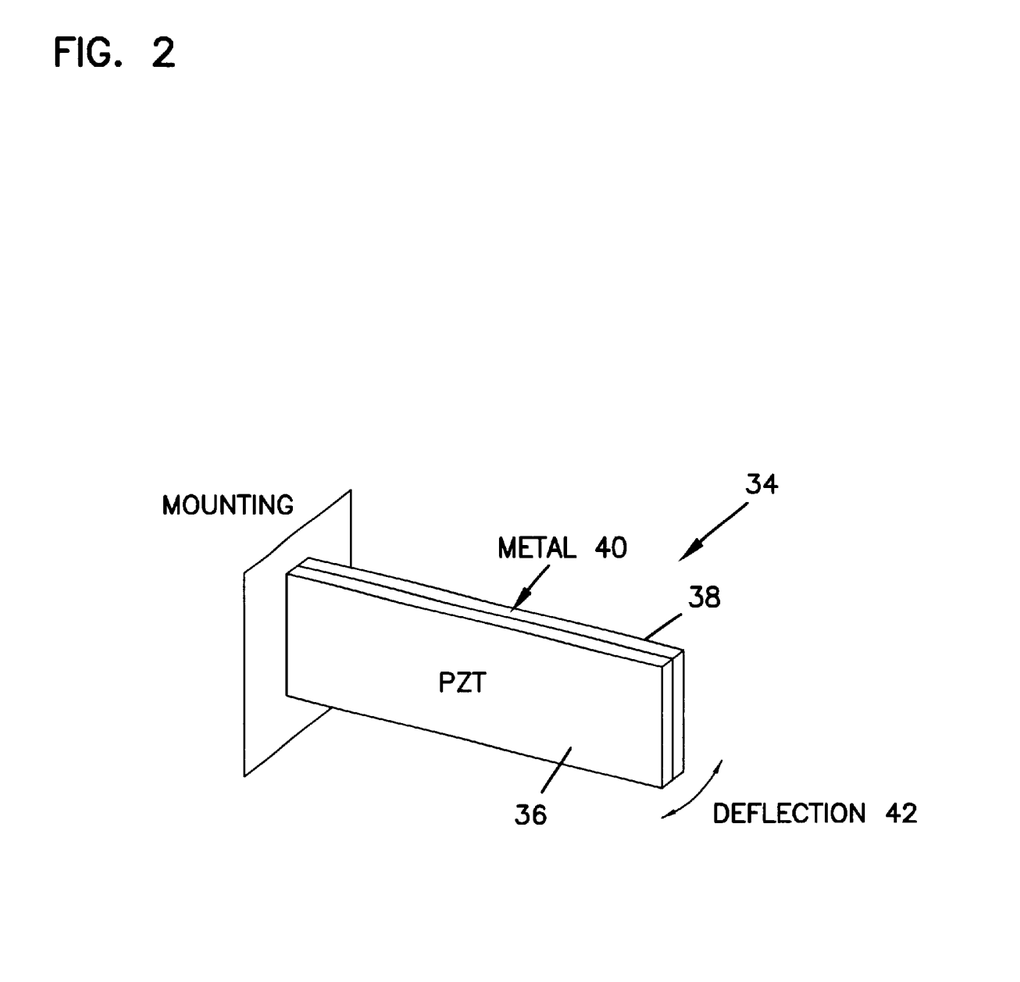
FIG. 2 illustrates a piezoelectric monomorph that may be used to implement the second stage positioner.

FIG. 2 illustrates a piezoelectric monomorph 34 that may be used to implement the second stage positioner. The monomorph 34 is comprised of piezoelectric elements 36, 38 bonded to a thin sheet metal structure 40. Applied voltages cause the piezo elements 36, 38 to expand or contract, which makes the structure 34 bend in much the same way a bimetallic strip does with changes in temperature. The piezoelectric monomorph 34 is fixedly mounted at one end while the opposite end produces the required motion by deflection through the arc labeled as 42. Similarly, the second-stage positioner may also use piezoelectric bimorphs, which are comprised of two piezoelectric crystals bonded together that deform in opposite directions to produce a curvature.

There is utilized the displacement or curvature of the monomorphs 34. This is possible by mounting the monomorph 34 such that its ends can rotate but not move. A monomorph 34 by itself would not be stable; it could buckle if subjected to vertical forces. This is why two intersecting monomorphs 34 are used, i.e., to create a more stable structure. Force or stiffness in the direction of deflection is not actually improved by utilizing the monomorph's 34 curvature instead of direct deflection.

Figure 3:
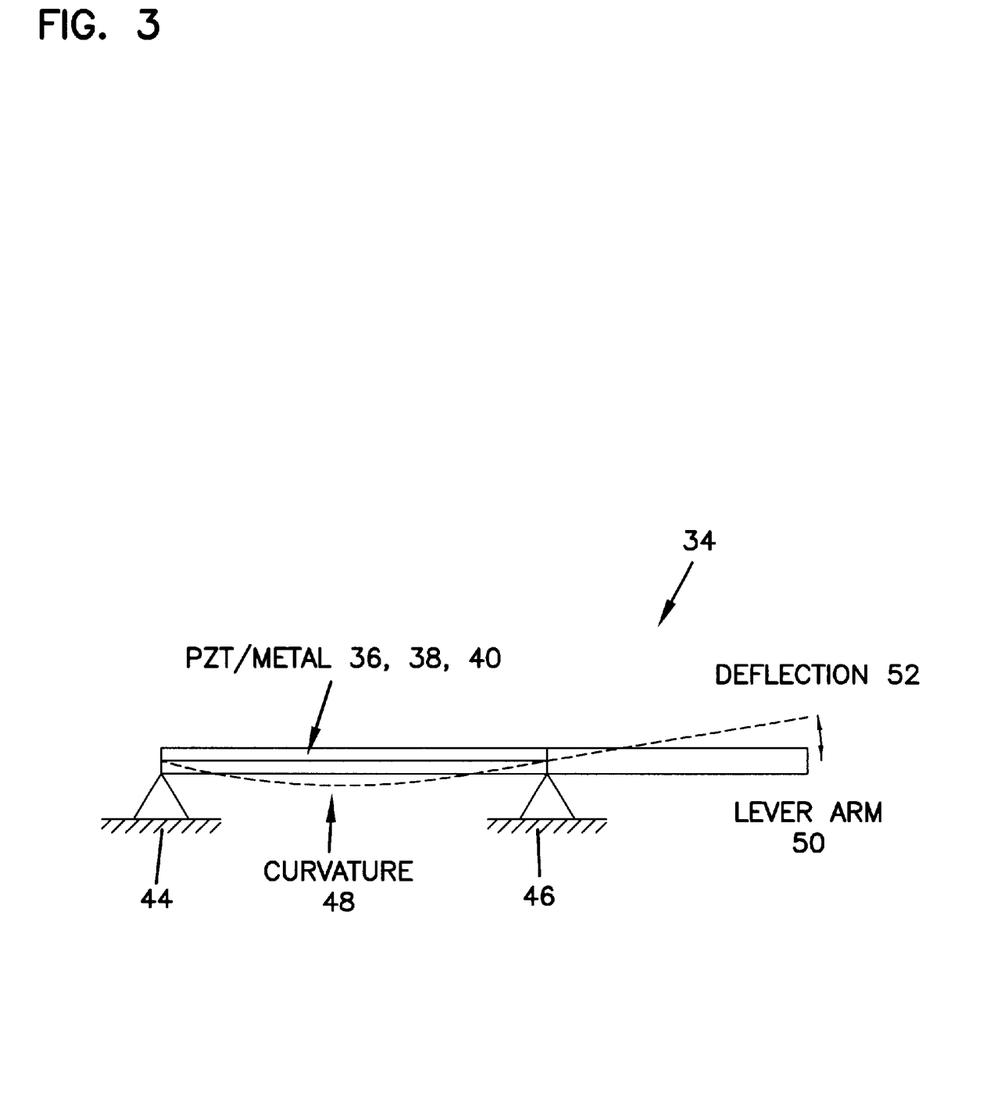
FIG. 3 illustrates a monomorph with pivots at each end.

FIG. 3 illustrates a monomorph 34 with pivots 44, 46 at each end. Voltages are applied to the piezoelectric elements 36, 38 bonded to the thin sheet metal structure 40, which causes the piezo elements 36, 38 to expand or contract. This expansion or contraction causes the structure 34 to bend through the curvature labeled as 48. The bending motion causes deflection in a lever arm 50 attached to one end of the monomorph 34 as indicated by the arc 52.

Figure 4:
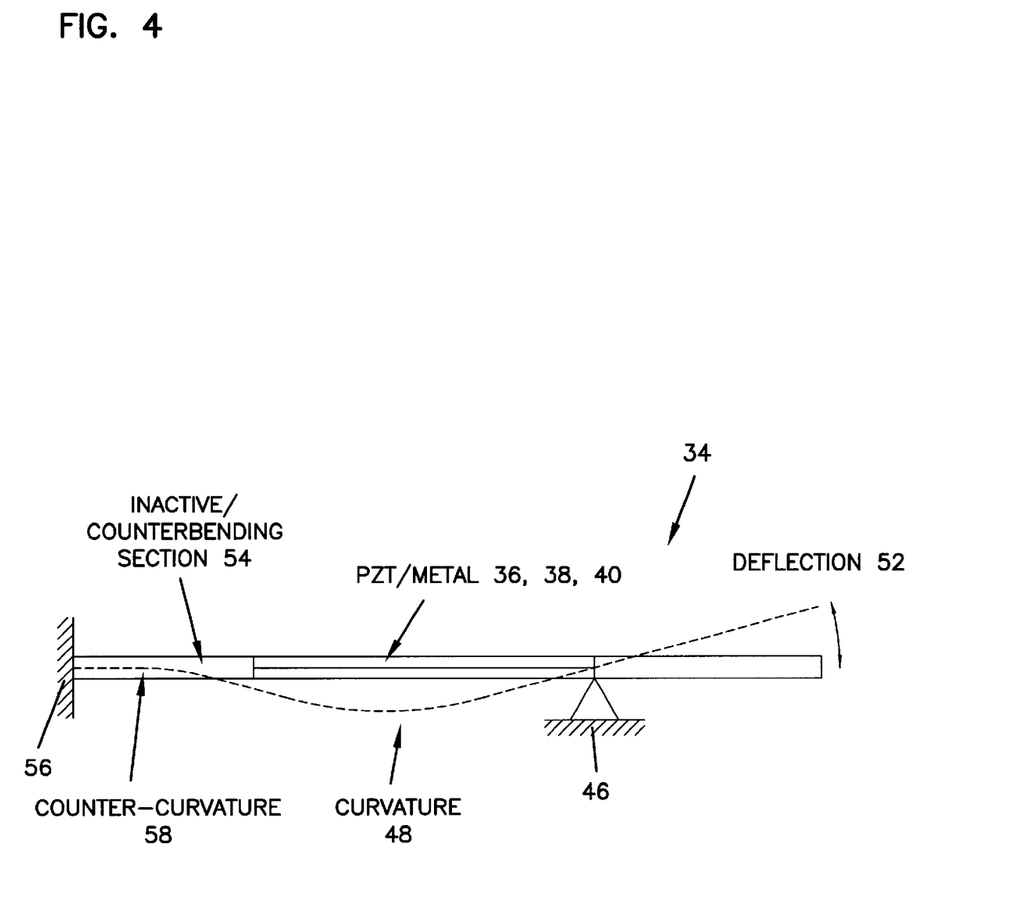
FIG. 4 illustrates a monomorph with one pivot at the end of the monomorph where the lever arm is attached.

For simplicity, however, the microactuator 26 may only use a pivot point at one end, and uses an inactive or counter-bending section at the other end to achieve the same effect. FIG. 4 illustrates a monomorph 34 with one pivot 46 at the end of the monomorph 34 where the lever arm 50 is attached. At the other end, the monomorph 34 is attached to an inactive or counter-bending section 54 that is fixedly mounted to a structure 56. Voltages are applied to the piezoelectric elements 36, 38 bonded to the thin sheet metal structure 40, which causes the piezo elements 36, 38 to expand or contract. This expansion or contraction causes the monomorph 34 to bend through the curvature labeled as 48. The bending motion causes deflection in a lever arm 50 attached to one end of the monomorph 34 as indicated by the arc 52. However, the inactive or counter-bending section 54 produces counter-curvature as indicated by the arc at 58.

Figure 5A:
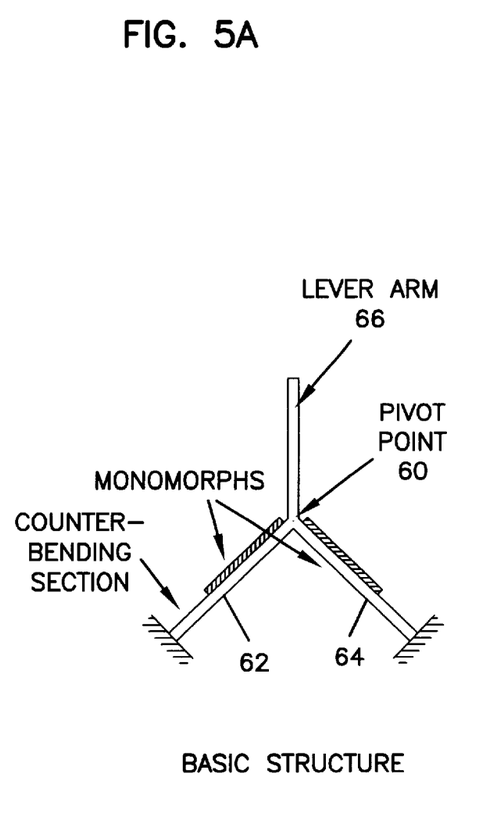
FIG. 5A illustrates another embodiment, wherein a pivot point is created by having two monomorphs intersect at their deflecting, ends, such that they prevent each other from deflecting translationally, leaving rotation about the pivot point as the only unconstrained degree of freedom.
Figure 5B:
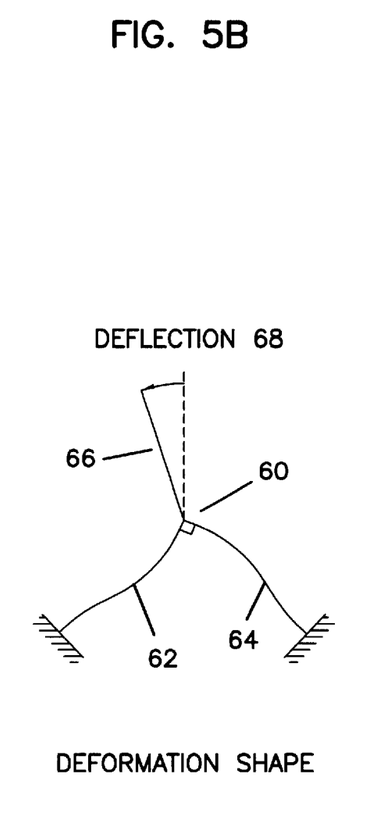
FIG. 5B illustrates the deflection of the lever arm through the arc when voltages are applied to the monomorphs causing them to bend in the manner indicated.

FIG. 5A illustrates another embodiment, wherein a pivot point 60 is created by having two monomorphs 62, 64 intersect at their deflecting ends, such that they prevent each other from deflecting translationally, leaving rotation about the pivot point 60 as the only unconstrained degree of freedom. A lever arm 66, to which the read/write head 28 is attached, is connected to this pivot point 60 and converts the rotation produced thereby into a translation at the head 28. FIG. 5B illustrates the deflection of the lever arm 66 through the arc 68 when voltages are applied to the monomorphs 62, 64 causing them to bend in the mainer indicated.

Figure 6:
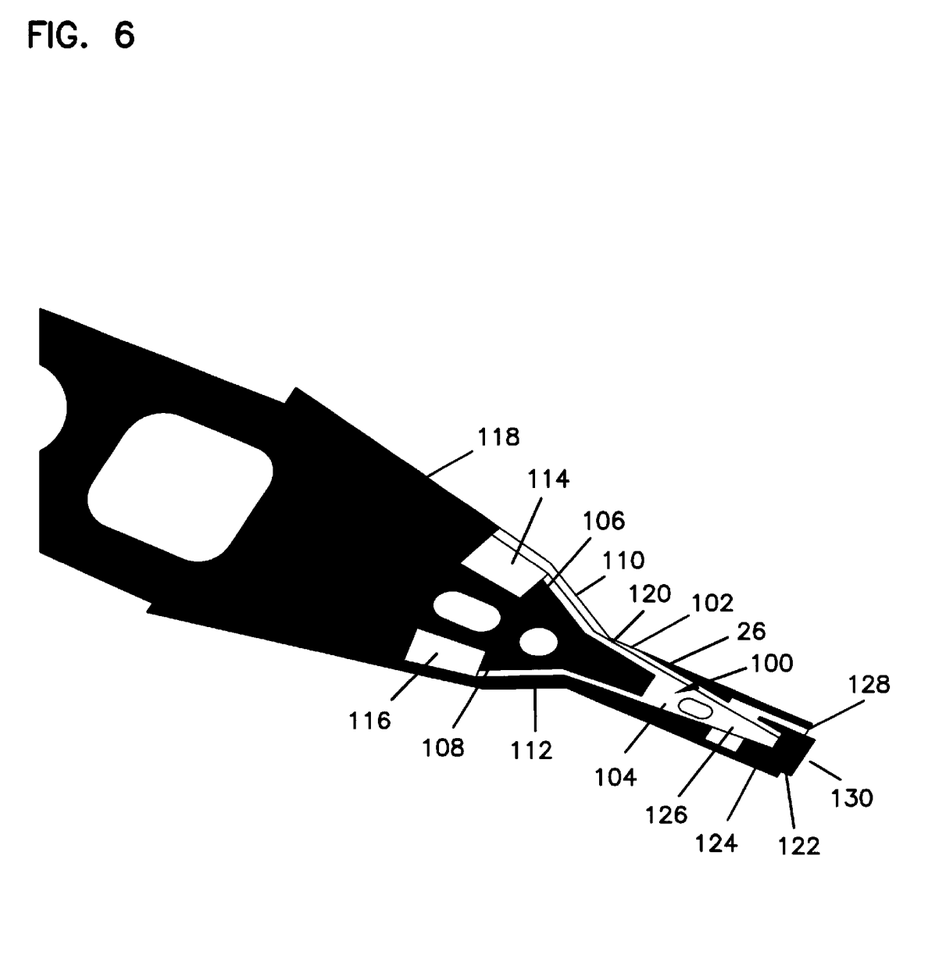
FIG. 6 illustrates a microactuator.

FIG. 6 illustrates a dual monomorph structure created from an etched sheet of stainless steel 100 by forming side rails 102 and 104 up normal to the sheet 100, bending their extending tabs 106 and 108 outwards to a specific angle, and bonding piezoelectric elements 110 and 112 to them. Large flat pads 114 and 116 at the end of these monomorph sections allow the microactuator 26 to be spot-welded to a modified load beam 118. The loadbeam 118 has a formed protrusion 120 which contacts a dimple 122 on the center beam 124 of the microactuator at the 'virtual pivot' location, helping to transmit the preload force.

A shortened, gimbal or flexure sheet 126 is spot-welded to the flat center section 124 of the resulting U-channel beam. To the end 128 of the gimbal or flexure sheet 126 there is glued the slider or head 130, which gimbals on a dimple as per current practice. Not shown in FIG. 6 is a flex circuit, which carries the electrical signals to and from the head 130, and carries the control voltage to the piezo elements 110 and 112. Only a single wire is attached to each monomorphs, with the suspension acting as the ground return. Opposite-poled regions on the piezo crystals 110 and 112 produces the opposite curvatures necessary at the base of the monomorphs.

In a particular version of the design, 70×16×4 mil piezoelectric elements 110 and 112 are bonded to a 3-mil thick stainless steel sheet 100. This sheet 100 has partially-etched lines etched into it along the fold lines of the forming operations, to improve the locating of these forms, reduce their bend radii, and lower the stresses involved during forming. The sheet 100 also has tooling holes etched into it, for manufacture, and slots in the side rails to allow the flex circuit to pass from the inside to the outside of the channel.

Figure 7:
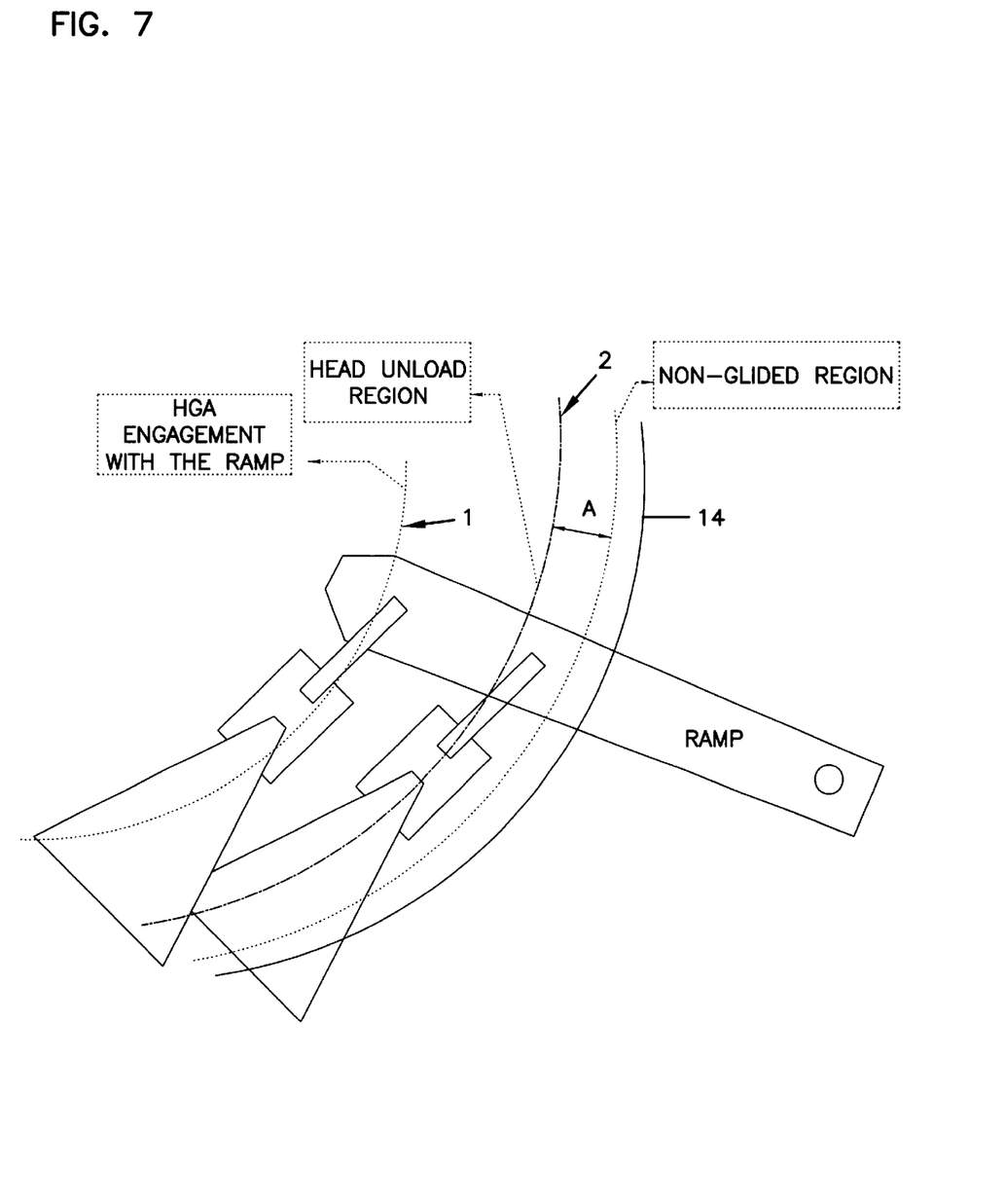
FIG. 7 shows successive positions of the head-gimbal assembly on the ramp during unload.

FIG. 7 shows a first position 1 and successive positions of the head-gimbal assembly during unload. Position 1 relates to the initial engagement of the head-gimbal with the ramp. Position 2 relates to the position the head is lifted from the disk. Distance A is the required travel of the head to overcome suction force. The head needs to be lifted before it engages the non-glided region.

The air bearing has three vibrational modes. The leading edge pitch mode, the trailing edge pitch mode, and the roll mode. These modes can be determined from either modeling or experimentation for each air bearing model. In normal operating conditions, it is suggested not to excite these modes since they may cause fly height modulation. However, during unloading of the head it is desirable to excite one or several of these modes to cause air bearing perturbations which allow unloading of the head. Since the air bearing is governed by Reynolds equations, the response of the system will be a function of the initial conditions of the system, namely a nonlinear system. Both the magnitude of the excitation and the mode of vibration affect the response of the air bearing.

As shown in the following table the air bearing modes vary form 40–100 kHz depending on the air bearing type and stiffness. It may be relatively difficult to cause the excitations with the current voice coil system, and the microactuators can perform such operations. The table shows air bearing frequencies, and the paranthetical numbers are predicted numbers.

| Air bearings | Leading Edge Pitch (kHz) | Roll Mode (kHz) | Trailing Edge Pitch (kHz) |
|---|---|---|---|
| 10 k program | 3.75 (32.2) | 66.0 (61.6) | 77–86.50 (70.90) |
| 710.01 | 27.40 (28.40) | 54.0 (49.50) | 89.90 (77.0) |
| Enhanced NPAB | ? (34.9) | 66.0 (53.2) | 74–88 (62.1) |
| NPAB | 45.52 (41.5) | 76.0 (78.6) | ? 88.4 |
| Pico (highly nonlinear) | 29.0 | 46.0 | 87.0 |

The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto.

What is claimed is:

1. Apparatus for positioning a head adjacent a recording surface of a recording media, said recording surface defining multiple data track locations, the apparatus comprising:
    a movable support and having a first positioner and a second positioner wherein the second positioner is coupled to the first positioner, the support arm further including a flexure element, the flexure element supporting the head adjacent the recording surface and being movable for positioning of the head relative to each data track location; and
    means for exciting an air bearing during an unloading operation of the support arm whereby the head can be removed from the air bearing in a manner whereby there is a reduced suction force between the head and the recording surface.

2. Apparatus as claimed in claim 1 wherein the air bearing further includes a plurality of air bearing modes, 5 and wherein a selected air bearing mode is selectively excitable to affect removing the head.

3. Apparatus as claimed in claim 1 further including means for generating a sweep function, wherein the sweep function perturbs the air bearing and causes instability to facilitate removing the head from the air bearing.

4. Apparatus as claimed in claim 1 wherein the second positioner further includes a microactuator for generating the excitation.

5. Apparatus as claimed in claim 1 further including a voice coil system for use with the movable support arm and whereby the voice coil system generates an additional excitation.

6. Apparatus as claimed in claim 1 further including means for varying the excitation selectively during excitation whereby an amplitude of the excitation is varied.

7. Apparatus as claimed in claim 1 wherein the support arm further includes a gimbal having a plurality of gimbal modes, and means for exciting at least one of the gimbal modes of the support arm, whereby exciting one of the gimbal modes further reduces the suction force.

8. Apparatus as claimed in claim 1 wherein the excitation relatively reduces the extent of travel up a ramp necessary to overcome the suction force prior to separation from the air bearing means.

9. Apparatus as claimed in claim 1 wherein the means for exciting effects a vibration in the air bearing, the vibration being selectively at least one of leading edge pitch mode vibration, trailing edge pitch mode vibration or roll mode vibration.

10. A method for positioning a head adjacent a recording surface of a recording media, said recording surface defining multiple data track locations, and a movable support arm having a flexure element, the flexure element supporting the head adjacent the recording surface and being movable for positioning of the head relative to each data track location, the method comprising the steps of:
    supporting the support arm with an air bearing relative to the recording surface; and
    exciting the air bearing during an unloading operation of the support arm whereby the head is removable from the air bearing in a manner wherein there is a reduced suction force between the head and the air bearing.

11. A method as claimed in claim 10 wherein the air bearing further includes multiple modes.

12. A method as claimed in claim 10 further comprising a step of generating a sweep function to perturb the air bearing and cause instability in the air bearing to facilitate unloading of the head from the air bearing.

13. A method as claimed in claim 10 further including the step of generating an excitation through a microactuator coupled to the support arm.

14. A method as claimed in claim 10 further comprising a step of generating a second excitation through a voice coil system.

15. A method as claimed in claim 10 further comprising the step of selectively varying the amplitude of the excitation.

16. A method as claimed in claim 10 further comprising the step of exciting one of a plurality of gimbal modes of the support arm thereby increasing the force acting on the air bearing and contributing to overcoming the suction force.

17. A method as claimed in claim 10 wherein said step of exciting the air bearing further comprises effecting a vibration on the air bearing, the vibration being selectively at least one of leading edge pitch mode vibration, trailing edge pitch mode vibration or roll mode vibration.

18. A method of reducing a suction force between a head and a surface of a recording medium when the recording medium is rotating, the method comprising the step of:
    creating an excitation in an air bearing between the head and the surface of the recording medium during unloading to effect a perturbation in the air bearing and thereby facilitate unloading of the head relative to the surface of the disc.

19. The method according to claim 18 wherein the air bearing is a suction bearing.

20. The method according to claim 18 further comprising the step of applying an excitation to perturbate at least one of a plurality of modes, wherein the modes are leading edge, trailing edge or roll.

21. The method according to claim 18 wherein the step of creating an excitation in the air bearing further comprises effecting a vibration between 40 Khz to 100 kHz.

* * * * *

UNITED STATES PATENT AND TRADEMARK OFFICE
CERTIFICATE OF CORRECTION

PATENT NO. : 6,301,080 B1
DATED : October 9, 2001
INVENTOR(S) : Boutaghou

It is certified that error appears in the above-identified patent and that said Letters Patent is hereby corrected as shown below:

<u>Column 5,</u>
Line 21, "arc" should read -- are --

Signed and Sealed this

Twenty-first Day of May, 2002

Attest:

Attesting Officer

JAMES E. ROGAN
*Director of the United States Patent and Trademark Office*